(12) United States Patent
Akao et al.

(10) Patent No.: US 7,515,769 B2
(45) Date of Patent: Apr. 7, 2009

(54) MAPPING-DATA ANALYZING METHOD AND APPARATUS

(75) Inventors: Kenichi Akao, Hachioji (JP); Toshiyuki Nagoshi, Hachioji (JP)

(73) Assignee: Jasco Corporation, Hachioji-shi, Tokyo (JP)

( * ) Notice: Subject to any disclaimer, the term of this patent is extended or adjusted under 35 U.S.C. 154(b) by 738 days.

(21) Appl. No.: 11/256,896

(22) Filed: Oct. 24, 2005

(65) Prior Publication Data

US 2006/0088217 A1    Apr. 27, 2006

(30) Foreign Application Priority Data

Oct. 25, 2004   (JP) ............................. 2004-309447

(51) Int. Cl.
*G06K 9/36* (2006.01)
(52) U.S. Cl. ..................... 382/282; 382/103; 382/128; 382/190
(58) Field of Classification Search ................ 382/103, 382/128, 154, 171, 282
See application file for complete search history.

(56) References Cited

U.S. PATENT DOCUMENTS

| | | | | |
|---|---|---|---|---|
| 5,241,362 A | * | 8/1993 | Ukon et al. .................. | 356/326 |
| 5,347,475 A | * | 9/1994 | Taylor et al. .................. | 703/12 |
| 5,784,162 A | * | 7/1998 | Cabib et al. .................. | 356/456 |
| 6,621,079 B1 | * | 9/2003 | Shao et al. .................. | 250/306 |
| 6,804,410 B2 | * | 10/2004 | Lennon et al. .............. | 382/274 |

OTHER PUBLICATIONS

Japanese Patent Abstract Publication No. 07-151678 published Jun. 16, 1995 "Infrared Microscope," two pages.

* cited by examiner

*Primary Examiner*—Yosef Kassa
(74) *Attorney, Agent, or Firm*—Rankin, Hill & Clark LLP (57) ABSTRACT

It is an object of the present invention to provide a mapping-data analyzing method that can display a map in which sufficient information is extracted from the spectra of obtained mapping data to enable objective analysis. The mapping-data analyzing method of the present invention is used for analyzing mapping data obtained by measuring, with a spectrometer apparatus, spectra at a plurality of points on a specimen surface. The method comprises a principal-component calculating step and a grouped-map display step. In the principal-component calculating step, spectral data obtained at each point on the specimen surface is defined as an individual sample and principal component analysis, in which values at a plurality of wave numbers of each spectral data set serve as variables, is performed to calculate the scores of a plurality of principal components for each individual sample. In the grouped-map display step, the points on the specimen surface are divided into a plurality of groups based on the scores of a plurality of principal components calculated in the principal-component calculating step and a two-dimensional or three-dimensional map indicating to which group each point on the specimen surface belongs is displayed on a display device.

19 Claims, 11 Drawing Sheets

CONCENTRATION

REFRACTIVE INDEX

MAPPING-DATA ANALYZING METHOD AND APPARATUS

RELATED APPLICATIONS

This application claims priority to the Japanese Patent Application 2004-309447 dated on Oct. 25, 2004 and is hereby incorporated with reference for all purposes.

BACKGROUND OF THE INVENTION

1. Field of the Invention

The present invention relates to improvements of mapping-data analyzing methods, programs, and apparatuses.

2. Description of Related Art

In order to examine the distribution of substances, defects, and so forth on the surface of a specimen, mapping measurement using a spectrometer is commonly performed. For example, in infrared microscopy, by irradiating a minute region on a specimen surface with infrared light and detecting the transmitted light or the light reflected therefrom, an infrared spectrum of the minute region can be collected. By moving the measuring region on the specimen or by using a two-dimensional detector, infrared spectra can be collected from each point on the specimen surface, and the distribution of substances can thus be examined.

When displaying the mapping measurement results as a two-dimensional or three-dimensional map, specific peaks are found in the infrared spectra obtained and the map is created based on the height of the peaks, the area of the peaks, and so on (for example, see Japanese Unexamined Patent Application Publication No. 07-151678). In other words, the map is displayed using only an extremely small part of the information in the measured spectra.

Extracting only specific peaks in this way means that only information about certain functional groups is displayed, and therefore, only a small part of the features in the entire spectrum is considered; that is, most of the information is discarded. In addition, since spectra normally contain multiple peaks, it is necessary to identify to which functional group or chemical bond the peak of interest corresponds. However, the peak of interest may overlap with another peak, which makes it difficult to assign the peaks, and therefore, subjective analysis must be relied upon to some extent. Also, when examining defects or flaws in the specimen, in many cases the defects exhibit different characteristics from other regions. Since it is unclear, prior to measurement, how the characteristics differ, it is necessary to consider the characteristics of the entire spectrum.

SUMMARY OF THE INVENTION

It is an object of the present invention to provide a mapping-data analyzing method, program, and apparatus that can display a map in which sufficient information is extracted from the spectra of obtained mapping data to enable objective analysis.

A mapping-data analyzing method of the present invention is a method for analyzing mapping data obtained by measuring, with a spectrometer apparatus, spectra at a plurality of points on a specimen surface. The method of the present invention comprises a principal-component calculating step and a grouped-map display step. In the principal-component calculating step, at least part of spectral data obtained at each point on the specimen surface is defined as an individual sample and principal component analysis, in which values at a plurality of wave numbers of each spectral data set serve as variables, is performed to calculate the scores of a plurality of principal components for each individual sample. In the grouped-map display step, the points on the specimen surface are divided into a plurality of groups based on the scores of a plurality of principal components calculated in the principal-component calculating step and a two-dimensional or three-dimensional map indicating to which group each point on the specimen surface belongs is displayed on a display device.

In the mapping-data analyzing method of the present invention, it is preferable that the method further comprises a scatterplot display step and a grouping setting step. In the scatterplot display step, a two-dimensional or three-dimensional scatterplot of the individual samples, in which a plurality of principal components calculated in the principal-component calculating step define axes, is displayed on the display device. In the grouping setting step, grouping criteria in the grouped-map display step are set based on the scatterplot displayed on the display device in the scatterplot display step.

In the mapping-data analyzing method of the present invention, it is preferable that the method further comprises a principal-component-score map display step. In the principal-component-score map display step, a two-dimensional or three-dimensional map of the scores of a principal component calculated in the principal-component calculating step is displayed on the display device.

In the mapping-data analyzing method of the present invention, it is preferable that the method further comprises a similarity calculating step. In the similarity calculating step, the similarity between the spectral data obtained at each point on the specimen surface and spectral data for one or a plurality of known substances, which is stored in a spectrum database, is calculated.

In the mapping-data analyzing method of the present invention, it is preferable that the similarity is a correlation coefficient or a Euclidean distance.

In the mapping-data analyzing method of the present invention, it is preferable that the method further comprises a step of displaying on the display device a two-dimensional or three-dimensional map of the similarity calculated in the similarity calculating step.

In the mapping-data analyzing method of the present invention, it is preferable that the grouping performed in the grouped-map display step is carried out on the basis of the similarity.

In the mapping-data analyzing method of the present invention, it is preferable that the method further comprises a concentration calculating step. In the concentration calculating step, the concentration of a predetermined substance present at each point on the specimen surface is calculated from the spectral data obtained at each point on the specimen surface.

In the mapping-data analyzing method of the present invention, it is preferable that the grouping performed in the grouped-map display step is carried out on the basis of the concentration calculated in the concentration calculating step.

In the mapping-data analyzing method of the present invention, it is preferable that the method further comprises a concentration-map display step of displaying a two-dimensional or three-dimensional map of the concentration calculated in the concentration calculating step.

In the mapping-data analyzing method of the present invention, it is preferable that the method further comprises a physical-property calculating step. In the physical-property calculating step, a physical-property at each point on the specimen surface is calculated from the spectral data measured at each point on the specimen surface.

In the mapping-data analyzing method of the present invention, it is preferable that the physical-property calculated in the physical-property calculating step is refractive index or dielectric constant.

In the mapping-data analyzing method of the present invention, it is preferable that the grouping performed in the grouped-map display step is carried out on the basis of the physical-property calculated in the physical-property calculating step.

In the mapping-data analyzing method of the present invention, it is preferable that the method further comprises a physical-property-map display step. In the physical-property-map display step, a two-dimensional or three-dimensional map of the physical-property calculated in the physical-property calculating step is displayed on the display device.

In the mapping-data analyzing method of the present invention, it is preferable that the method further comprises a thickness calculating step. In the thickness calculating step, a thickness at each point on the specimen surface is calculated from the spectral data measured at each point on the specimen surface.

In the mapping-data analyzing method of the present invention, it is preferable that the grouping performed in the grouped-map display step is carried out on the basis of the thickness at each point of the specimen, which is calculated in the thickness calculating step.

In the mapping-data analyzing method of the present invention, it is preferable that the method further comprises a thickness-map display step. In the thickness-map display step, a two-dimensional or three-dimensional map of the thickness at each point on the specimen surface, which is calculated in the thickness calculating step, is displayed on the display device.

A mapping-data analyzing program of the present invention executes each step in the mapping-data analyzing method of the present invention on a computer.

A mapping-data analyzing apparatus of the present invention analyzes mapping data obtained by measuring a spectrum from a plurality of points on a specimen surface. the apparatus of the present invention comprises a storage device, a principal-component calculating unit, a grouped-map creating unit, and a display device. The storage device stores spectral data for each point on the specimen surface. The principal-component calculating unit defines at least part of the spectral data stored in the storage device as individual samples and performs principal component analysis, in which values at a plurality of wave numbers in each spectral data set serve as variables, to calculate the scores of a plurality of principal components for each individual sample. The grouped-map creating unit divides the points on the specimen surface into a plurality of groups on the basis of the scores of a plurality of principal components calculated in the principal-component calculating unit and creates a two-dimensional or three-dimensional grouped map that indicates to which group each point on the specimen surface belongs. The display device displays the grouped map.

DESCRIPTION OF THE PREFERRED EMBODIMENT

Preferred embodiments of the present invention will be described below with reference to the drawings.

First Embodiment

Figure 1:
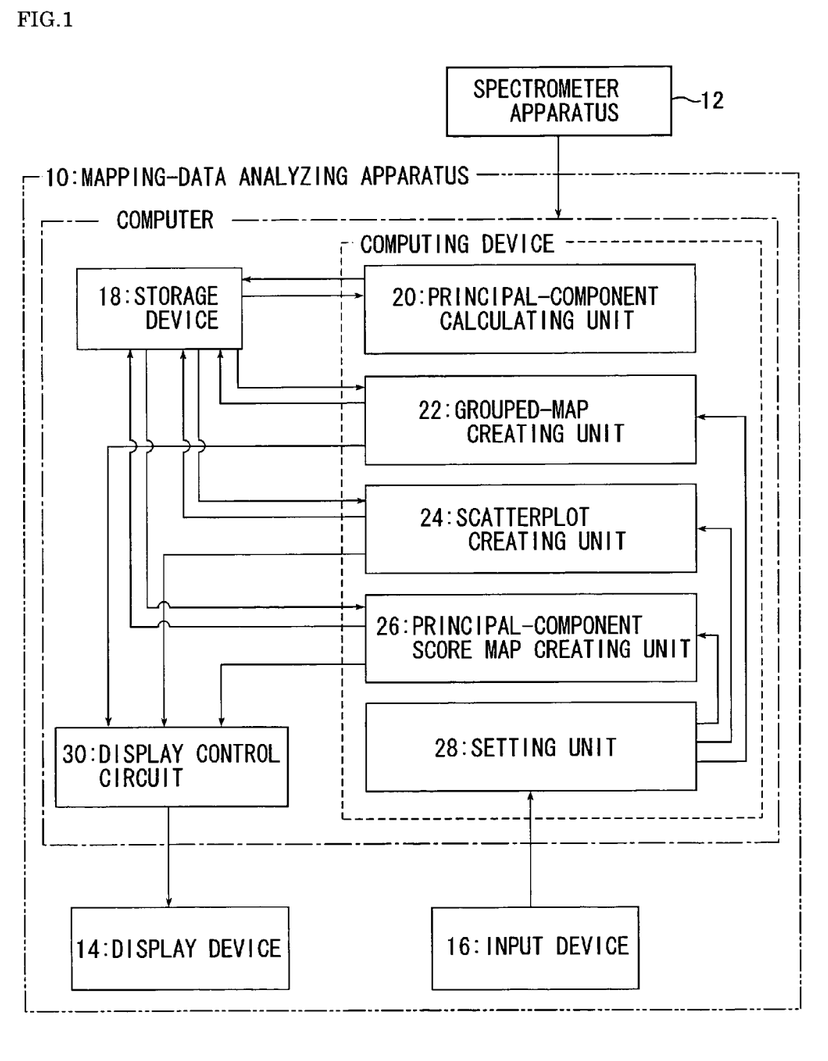
FIG. 1 is a block diagram of a mapping-data analyzing apparatus according to a first embodiment of the present invention.

FIG. 1 is a view showing a rough structure of a mapping-data analyzing apparatus 10 according to a first embodiment of the present invention. The mapping-data analyzing apparatus 10 in FIG. 1 is connected to a spectrometer apparatus 12, which is capable of mapping measurement, and receives measurement data from the spectrometer apparatus 12 and stores it. The spectrometer apparatus 12 is a multi-channel infrared microscope or the like. The mapping-data analyzing apparatus 10 is formed of, for example, a computer and includes a display device 14 and an input device 16, such as a keyboard, a mouse, or the like.

The spectrometer apparatus 12 measures spectral data from a plurality of points of the specimen surface. The measured spectral data is sent to the mapping-data analyzing apparatus 10 together with position information on the specimen surface, and these are stored in a storage device 18, such as a hard disk or memory. In this way, spectral data for each point on the specimen surface is stored in such manner that it is associated with the position coordinates on the specimen surface.

Various calculations are performed on the spectral data stored in the storage device 18 by a computing device. In the mapping-data analyzing apparatus 10 according to this embodiment, the individual units described below are realized as programs that the computing device executes.

In a principal-component calculating unit 20, spectral data for each point on the specimen surface are defined as individual sample data, and principal component analysis (PCA), in which values (intensity, etc.) at a plurality of wave numbers of each spectral data are defined as variables, is carried out to calculate principal component scores for the individual samples.

In a grouped-map creating unit 22, the points on the specimen surface are divided into a plurality of groups based on the plurality of principal component scores, and a two-dimensional or three-dimensional map that indicates to which group each point on the specimen surface belongs is created based on this grouping.

In a scatterplot creating unit 24, scores for one or a plurality of principal components in individual samples are plotted on the axes to create a scatterplot of the sample data. Also, in a principal-component-score map creating unit 26, a map is created based on predetermined principal component scores of the individual samples.

In addition, grouping criteria for the grouped map described above can be specified with a setting unit 28.

The display on the display device 14 of the map and/or the scatterplot created by the grouped-map creating unit 22, the scatterplot creating unit 24, and the principal-component-score map creating unit 26 is controlled by a display control circuit 30.

Figure 2:
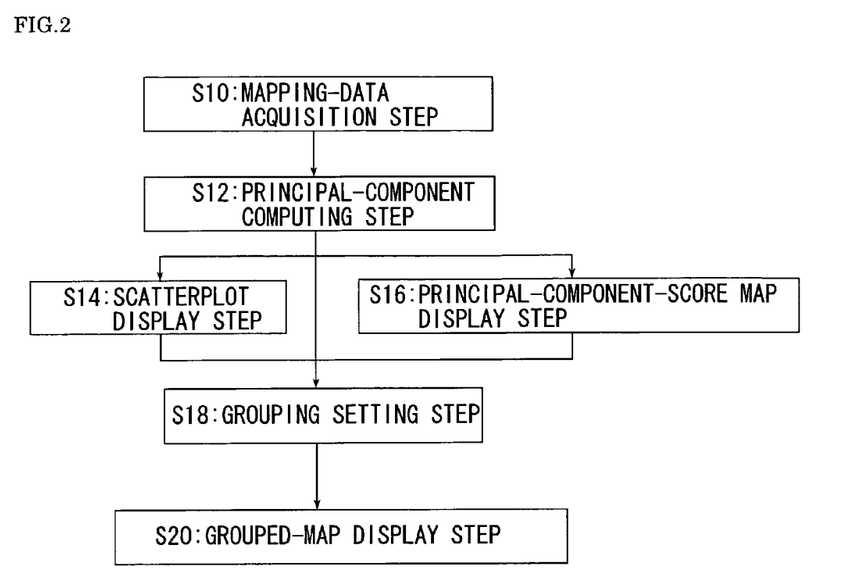
FIG. 2 is a flow chart of a mapping-data analyzing method according to the first embodiment of the present invention.

Next, an example of the procedure for analyzing the mapping data using the mapping-data analyzing apparatus 10 according to this embodiment will be described (see FIG. 2).

First, in a mapping-data acquisition step S10, mapping measurement is carried out on the spectrum (absorption spectrum, reflection spectrum, etc.) at each point in a predetermined area on the specimen surface. At this time, mapping data combining position coordinate information of the points on the specimen surface and spectral data at those points is stored in the storage device 18 in the mapping-data analyzing apparatus 10.

In a principal-component computing step S12, for the data obtained in the mapping measurement, the spectral data for each point on the specimen surface is defined as an individual sample and principal component analysis is carried out. Here, the user of the apparatus can specify, via the input device 16, wave numbers in the spectrum whose values are to be used as variables and a region on the specimen surface to be subjected to principal component analysis. In the principal-component calculating unit 20, spectral data for each point is read out from the storage unit 18 and subjected to principal component analysis. The obtained principal component scores for each sample (each spectrum measured at each point on the specimen surface) are stored in the storage device 18 in association with the position information on the specimen surface.

Figure 3:
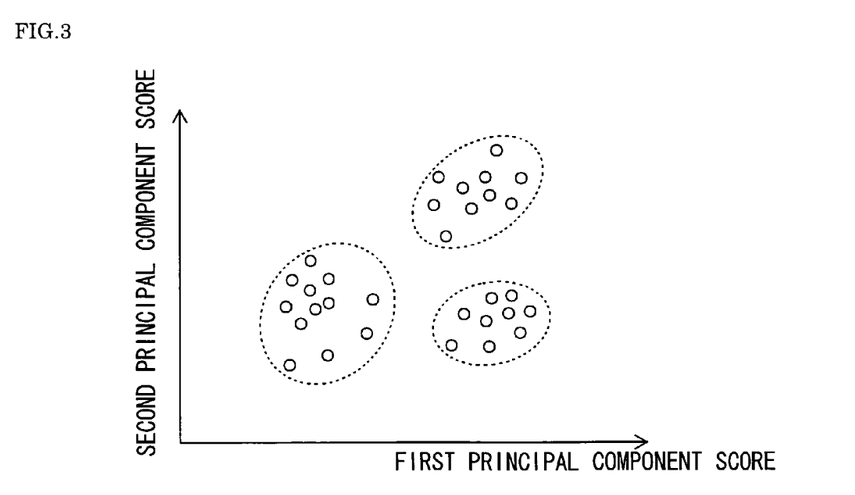
FIG. 3 is an example showing a two-dimensional scatterplot.
Figure 4:
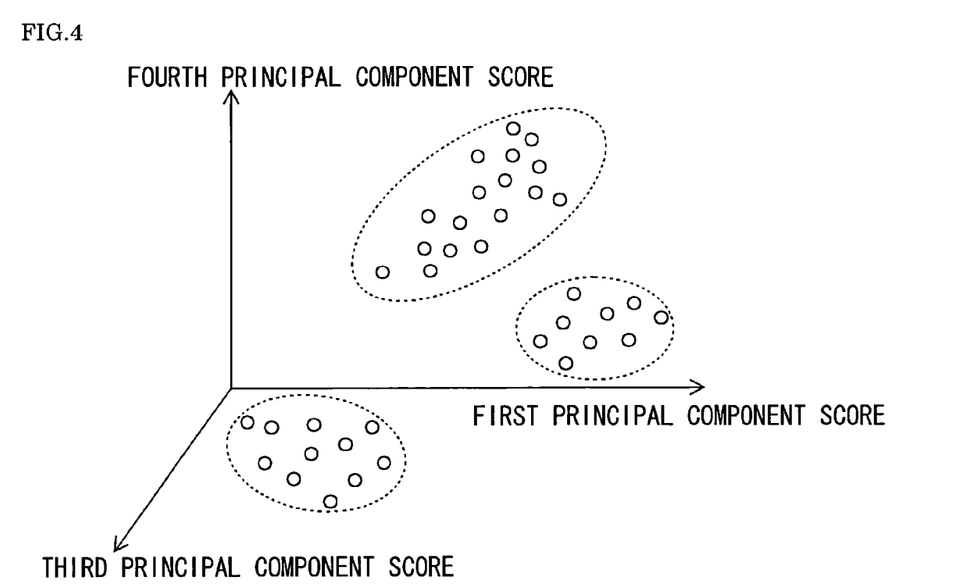
FIG. 4 is an example showing a three-dimensional scatterplot.

In a scatterplot display step S14, the plurality of principal component scores define the axes and a scatterplot for the samples (each point on the specimen surface) is displayed. At this time, using the setting unit 28, the user can set, via the input device 16, the principal components to be used to define the axes for creating the scatterplot. That setting information is sent to the scatterplot creating unit 24, where the principal component scores for each sample (each point on the specimen surface) that define the axes are read out from the storage device 18 to create a scatterplot for the samples. The created scatterplot is displayed on the display device 14 by the display control circuit 30. For example, when two principal component scores, that is, a first principal component score and a second principal component score, are selected as the axes, a two-dimensional scatterplot is displayed, as shown in FIG. 3. When three principal component scores, for example, first, third, and fourth principal component scores, are selected as the axes, a three-dimensional scatterplot can be displayed, as shown in FIG. 4.

Figure 5:
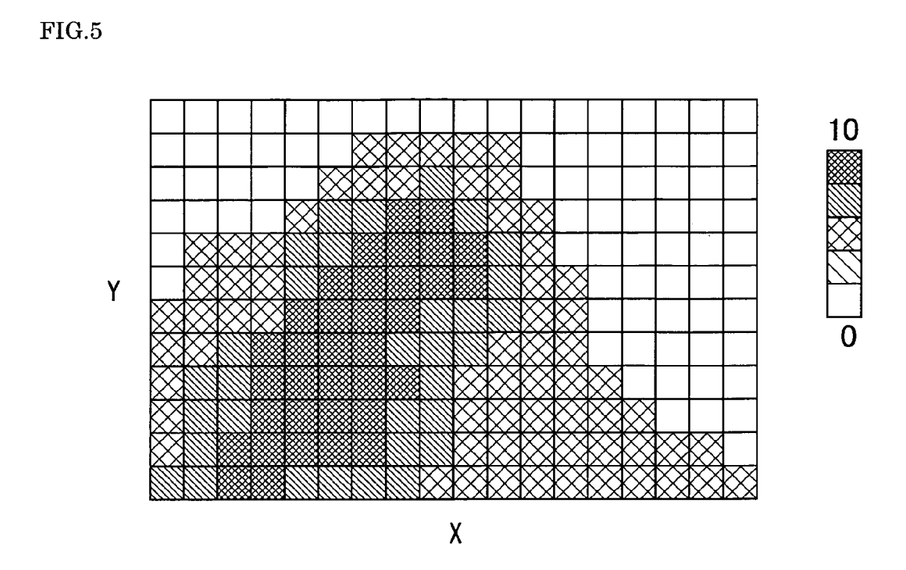
FIG. 5 is an example showing a principal-component-score map (two dimensional).
Figure 6:
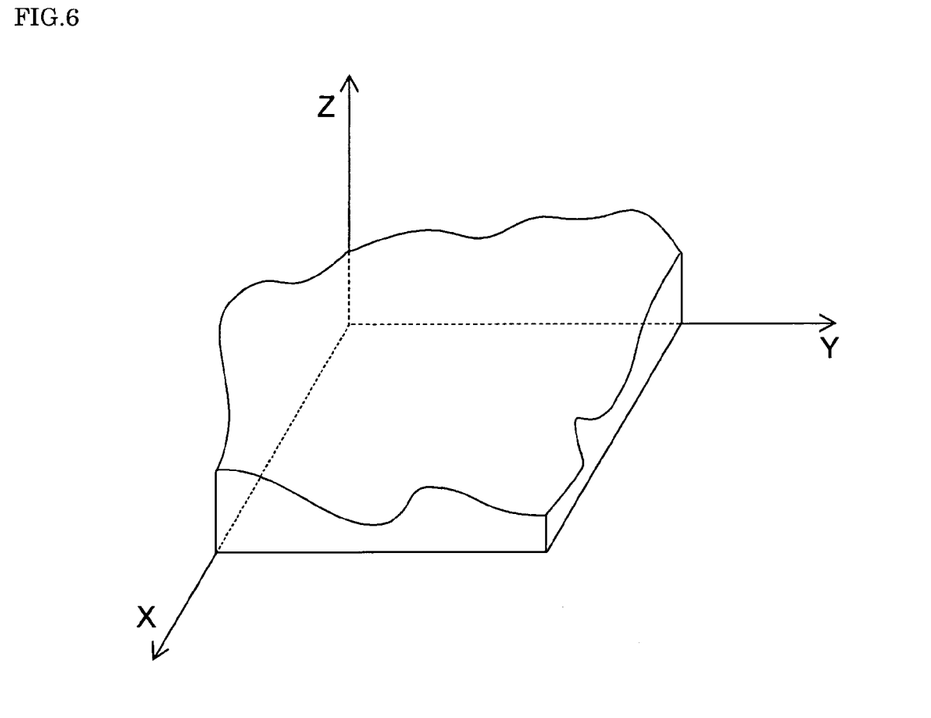
FIG. 6 is an example showing a principal-component-score map (three dimensional).

In a principal-component-score map display step S16, a map of the scores of a desired principal component is displayed. A two-dimensional example is shown in FIG. 5. The two-dimensional map shown in FIG. 5, whose horizontal and vertical axes represent the X-coordinate and Y-coordinate on the specimen surface, is separated into different colors (different fill patterns) according to the principal component score at each point. Using the setting unit 28, the user can specify, via the input device 16, a desired principal component whose scores are to be used in creating the map. In the principal-component-score map creating unit 26, based on the setting information sent from the setting unit 28, the principal component scores for the data at each point, which are stored in the storage device 18, are read out to create the map. The created map is displayed on the display device 14 by the display control circuit 30. Alternatively, the map may be displayed as a three-dimensional graph in which the specimen surface is represented on the XY plane and the principal component scores are shown on the Z-axis (see FIG. 6).

In a grouping setting step S18, criteria for grouping the points in at predetermined area on the specimen surface into a plurality of groups are set based on the plurality of principal component scores calculated in the principal-component calculating step S12. For example, criteria are set such that samples (spectra measured at points on the specimen surface) whose first principal component scores are from 10 to 30 inclusive, whose second principal component scores are 20 or above, and whose fourth principal component scores are 40 or below form a first group; samples (points on the specimen surface) whose first principal component scores are from 10 to 30 inclusive, whose second principal component scores are 20 or less, and whose fourth principal component scores are from 100 to 200 inclusive form a second group; and so on. In this grouping setting step, the user can set the grouping criteria by referring to a scatterplot such as that shown in FIG. 3 or 4 or a map such as that shown in FIG. 5 or 6. For example, when a scatterplot such as that shown in FIG. 3 or 4 is displayed on the display device 14, the user moves a pointer displayed on the display device 14 using the input device 16, such as a mouse, to select desired areas on the scatterplot (for example, the portions surrounded by dotted lines in FIGS. 3 and 4). In the setting unit 28, samples included in each area selected by the user form one group, and the criteria therefore (the ranges of principal component scores) are stored in the storage unit 18.

Figure 7:
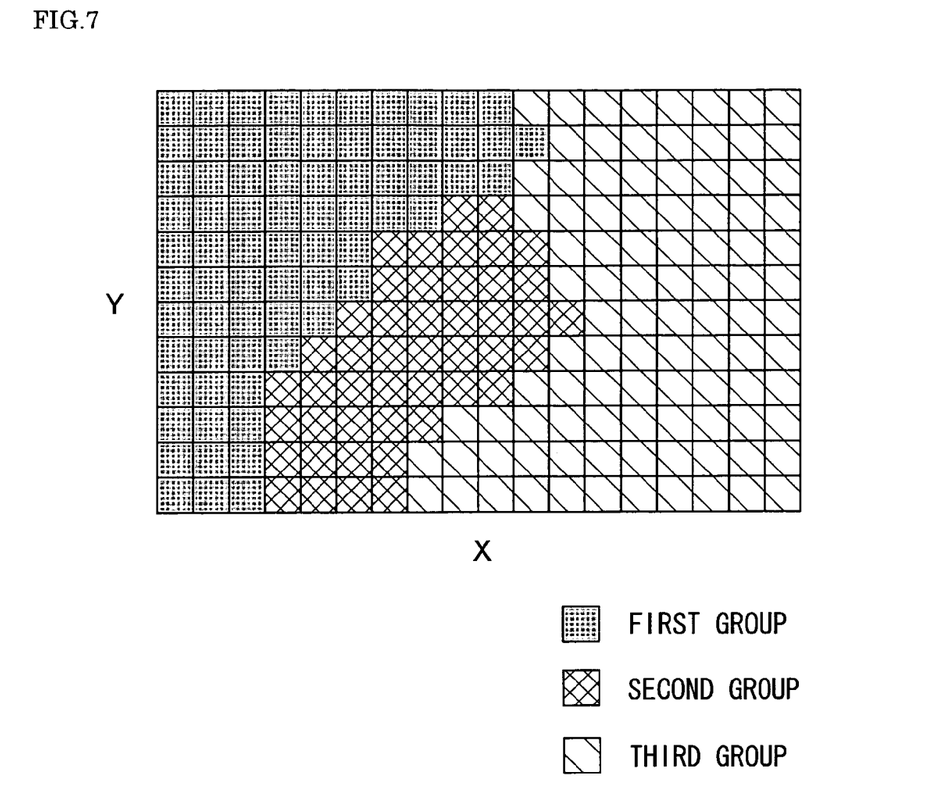
FIG. 7 is an example showing a grouped map.

In a grouped-map display step S20, based on the grouping criteria set in the grouping setting step S18, a two-dimensional or three-dimensional map indicating to which group the points on the specimen surface belong is displayed. The grouped-map creating unit 22 reads out the grouping criteria and the principal component scores for each sample (each spectrum measured at each point on the specimen surface) from the storage device 18, determines to which groups the samples belong using the grouping criteria, and creates a grouped map. The created map is displayed on the display device 14 by the display control circuit 30. An example grouped map is shown in FIG. 7. The map in FIG. 7, whose horizontal and vertical axes represent the position coordinates (X-coordinate and Y-coordinate) on the specimen surface, is divided into different colors for the groups to which the points belong (in the figure shown, each small square region into which the large rectangle is divided represents one point). In the example shown here, the points are divided into three groups, but the number of groups is not limited to three.

By performing analysis using this type of grouped map, it is possible to examine the distribution of substances on a specimen surface, the position of defects on a specimen surface, and so on, more accurately than with conventional techniques. In other words, since analysis is performed using values at a plurality of wave numbers in the spectral data for each point as variables, it is possible to obtain more information than from a map based on the intensity of a specific peak, as in the conventional technique, which allows more comprehensive analysis to be easily carried out. For example, when looking for defects in a specimen using the conventional technique, it is not necessarily clear prior to measurement what characteristics the defects exhibit, and therefore, it is difficult to determine which parts are defects using only information about specific peaks in the measured spectral data. With the present embodiment, however, principal component analysis is carried out using values at a plurality of wave numbers in the spectral data as variables, and a grouped map in which samples are divided into groups according to a plurality of principal component scores is displayed. Therefore, it is possible to display a map containing much more information from measured spectral data compared with the conventional approach. As a result, the apparatus and method according to this embodiment are extremely effective even when searching for features such as defects.

With the mapping-data analyzing apparatus and method according to this embodiment, analysis can be carried out without the need to assign the peaks in the spectrum for each point. When analyzing a complex specimen such as a living organism, the spectral data from each point contains a plurality of overlapping peaks, which makes it extremely difficult to identify the peaks with the conventional approach. With the present embodiment, however, it is possible to perform analysis objectively with using statistical techniques.

In the present embodiment, during the grouping setting step S18 described above, in the example shown, the scatterplot and the principal-component-score map have been displayed in the scatterplot display step S14 and the principal-component-score map display step S16; however, these steps are not required. In other words, it is not necessary to use the scatterplot and the principal-component-score map described above in the grouping setting step S18; the grouping criteria may be set using any desired method. However, by displaying the scatterplot and the principal-component-score map described above, the user can intuitively set the grouping criteria.

Second Embodiment

Figure 8:
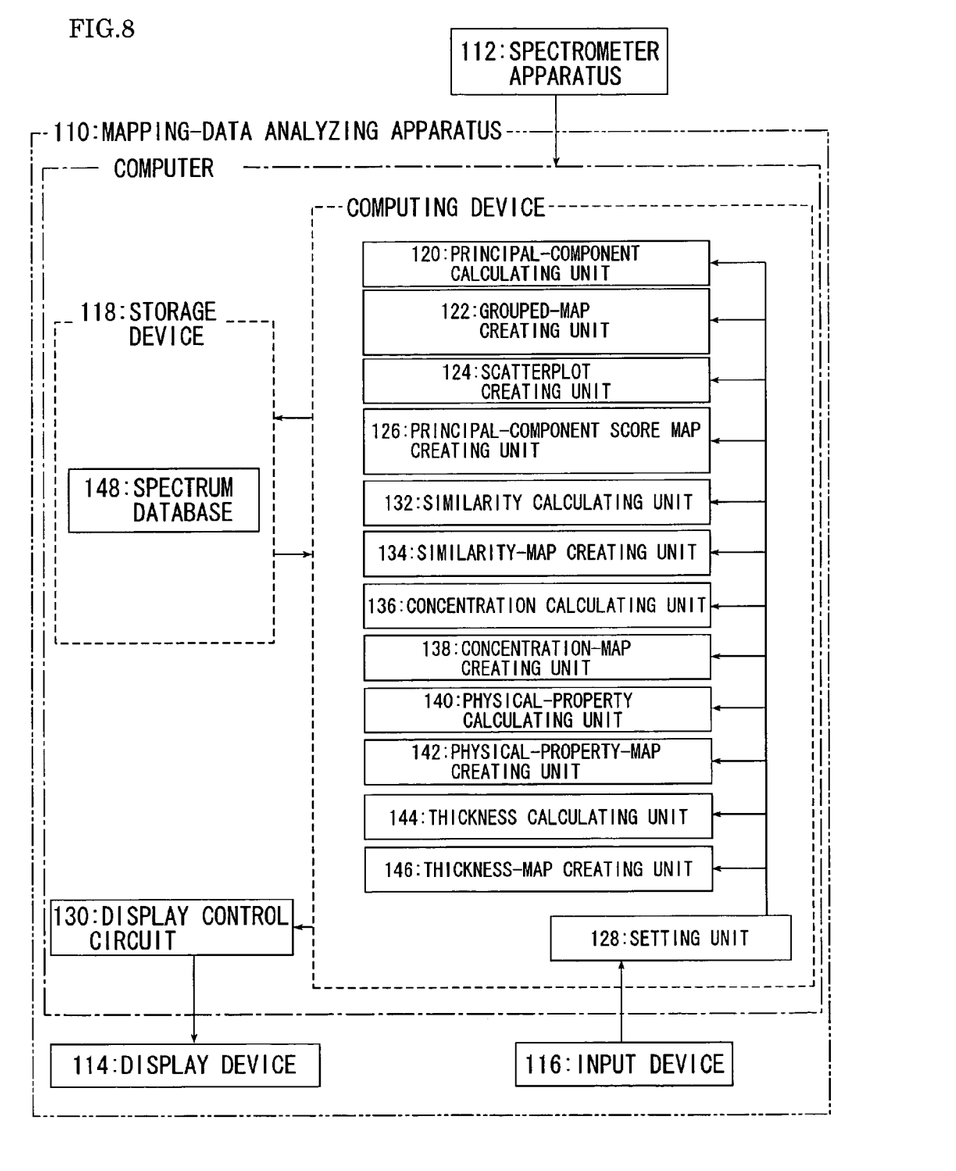
FIG. 8 is a block diagram of a mapping-data analyzing apparatus according to a second embodiment of the present invention.

Next, a second embodiment of the present invention will be described. FIG. 8 is a block diagram of a mapping-data analyzing apparatus 110 according to the second embodiment. Reference numerals for the components and steps corresponding to those shown in FIGS. 1 and 2 have 100 added thereto, and a detailed description thereof is omitted.

Compared with the mapping-data analyzing apparatus 10 described in the first embodiment, the mapping-data analyzing apparatus 110 shown in FIG. 8 further includes a similarity calculating unit 132, a similarity-map creating unit 134, a concentration calculating unit 136, a concentration-map creating unit 138, a physical-property calculating unit 140, a physical-property-map creating unit 142, a thickness calculating unit 144, and a thickness-map creating unit 146. These units are realized as programs that a computing device in the mapping-data analyzing apparatus 110 executes.

The similarity calculating unit 132 calculates the similarity between spectral data for known substances, which is stored in a spectrum database 148 in a storage device 118, and spectral data for each point on a specimen. The similarity is estimated in terms of a correlation coefficient, Euclidean distance, or the like. The similarity-map creating unit 134 creates a map of the similarity calculated in the similarity calculating unit 132. The concentration calculating unit 136 calculates the concentration of a predetermined substance from the measured spectral data. Calculation of the concentration is carried out using a measuring model stored in advance in the storage device 118. The concentration-map creating unit 138 creates a map of the concentration calculated in the concentration calculating unit 136.

The physical-property calculating unit 140 calculates properties from the measured spectral data. These physical-properties include refractive index, dielectric constant, and so on. For example, calculation of the refractive index and dielectric constant from a reflection spectrum may be performed using a known method, such as Kramers-Kronig (K-K) transformation. The physical-property-map creating unit 142 creates a map of the physical-properties calculated in the physical-property calculating unit 140.

The thickness calculating unit 144 calculates film thickness from the measured spectral data. The film thickness can be obtained using a known method (for example, see Japanese Unexamined Patent Application Publication No. 07-4922), such as a method in which interference patterns of the spectral data are extracted and the film thickness is determined from the period of those interference patterns. The thickness-map creating unit 146 creates a map of the thickness calculated in the thickness calculating unit 144.

Figure 9:
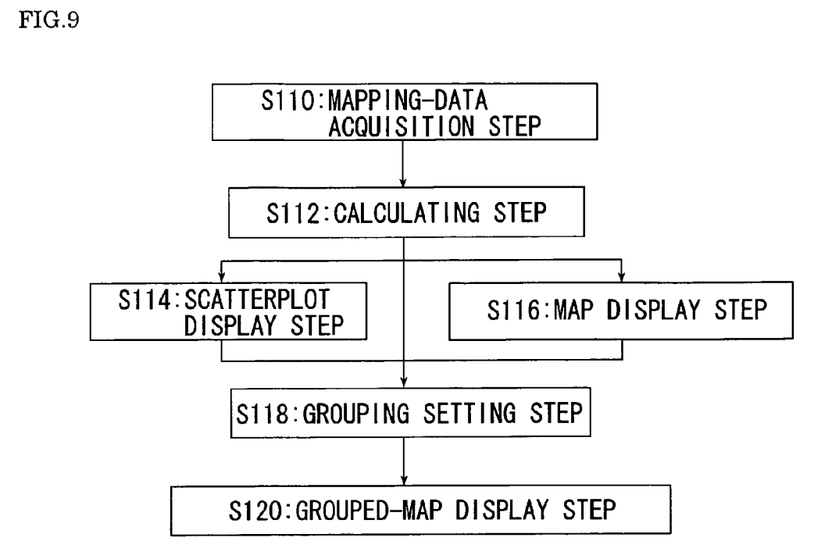
FIG. 9 is a flow chart of a mapping-data analyzing method according to the second embodiment of the present invention.

Next, an example of the procedure for mapping-data analysis using the mapping-data analyzing apparatus 110 according to the present embodiment will be described (see FIG. 9).

In a mapping-data acquisition step S110, a spectrometer apparatus 112 performs mapping measurement of the spectra (absorption spectra, reflection spectra, etc.) for a predetermined area of the specimen surface. At this time, mapping data combining position coordinate information of the each point in the area on the specimen surface and spectral data for those points is stored in the storage device 118 in the mapping-data analyzing apparatus 110.

In a calculating step S112, the spectral data for each point on the specimen surface, which data is obtained in the mapping measurement, is defined as an individual sample, and a desired calculation for each sample (spectral data measured at each point) is executed. In other words, using the principal-component calculating unit 120, the similarity calculating unit 132, the concentration calculating unit 136, the physical-property calculating unit 140, and the thickness calculating unit 144, calculated values at each point, such as principal component scores, similarity, concentration, physical-properties, and thickness, are obtained from the spectral data. The calculated values for each sample (each spectrum measured at each point on the specimen surface), such as the principal component scores, similarity, concentration, physical-properties, and thickness, are stored in the storage device 118 in association with the position information on the specimen surface. The calculated values obtained in the calculating step S112 need not be all of those described above; only those values required need be selected.

Figure 10:
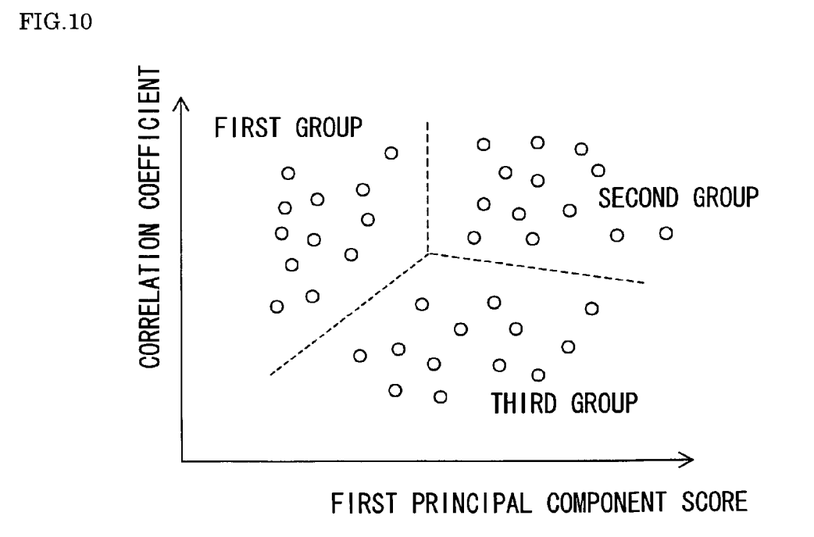
FIG. 10 is an example showing a two-dimensional scatterplot.
Figure 11:
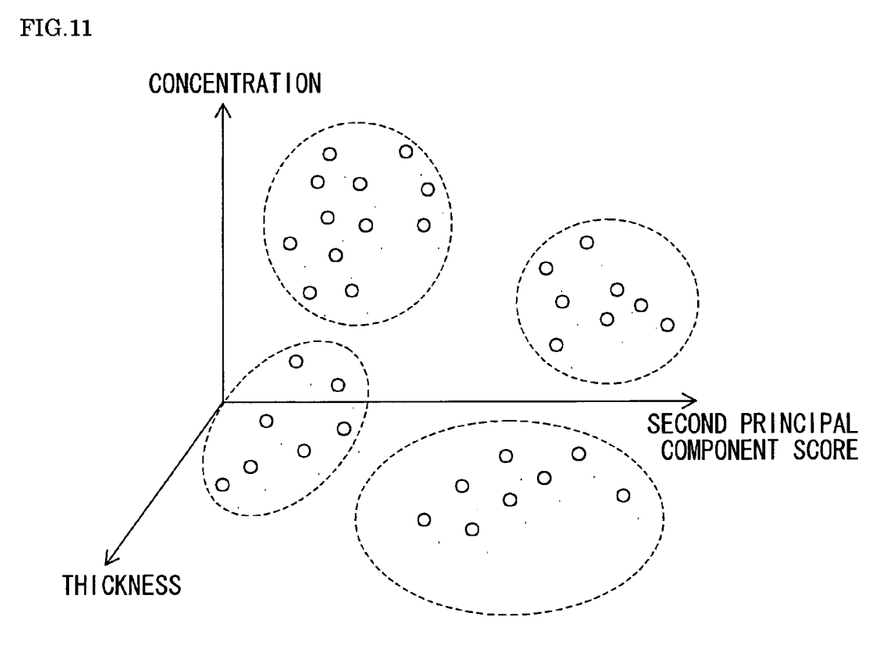
FIG. 11 is an example showing a three-dimensional scatterplot.

In a scatterplot display step S114, a plurality of calculated values calculated in the calculating step S112 define the axes used to display a scatterplot of the samples (points on the specimen surface). At this time, by using a setting unit 128, the user can specify, via an input device 116, which calculated values will define the axes for creating a scatterplot. That setting information is sent to a scatterplot creating unit 124, where the calculated values for each sample (each spectrum measured at each point on the specimen surface), which define the axes, are read out from the storage device 118 to create a scatterplot of the samples. The created scatterplot is displayed on a display device 114 by a display control circuit 130. For example, when two calculated values, namely, a first principal component and a correlation coefficient (similarity), are selected to define the axes, a two-dimensional scatterplot is displayed, as shown in FIG. 10. When three calculated values, for example, a second principal component, thickness, and concentration, are selected to define the axes, a three-dimensional scatterplot can be displayed, as shown in FIG. 11.

Figure 12:
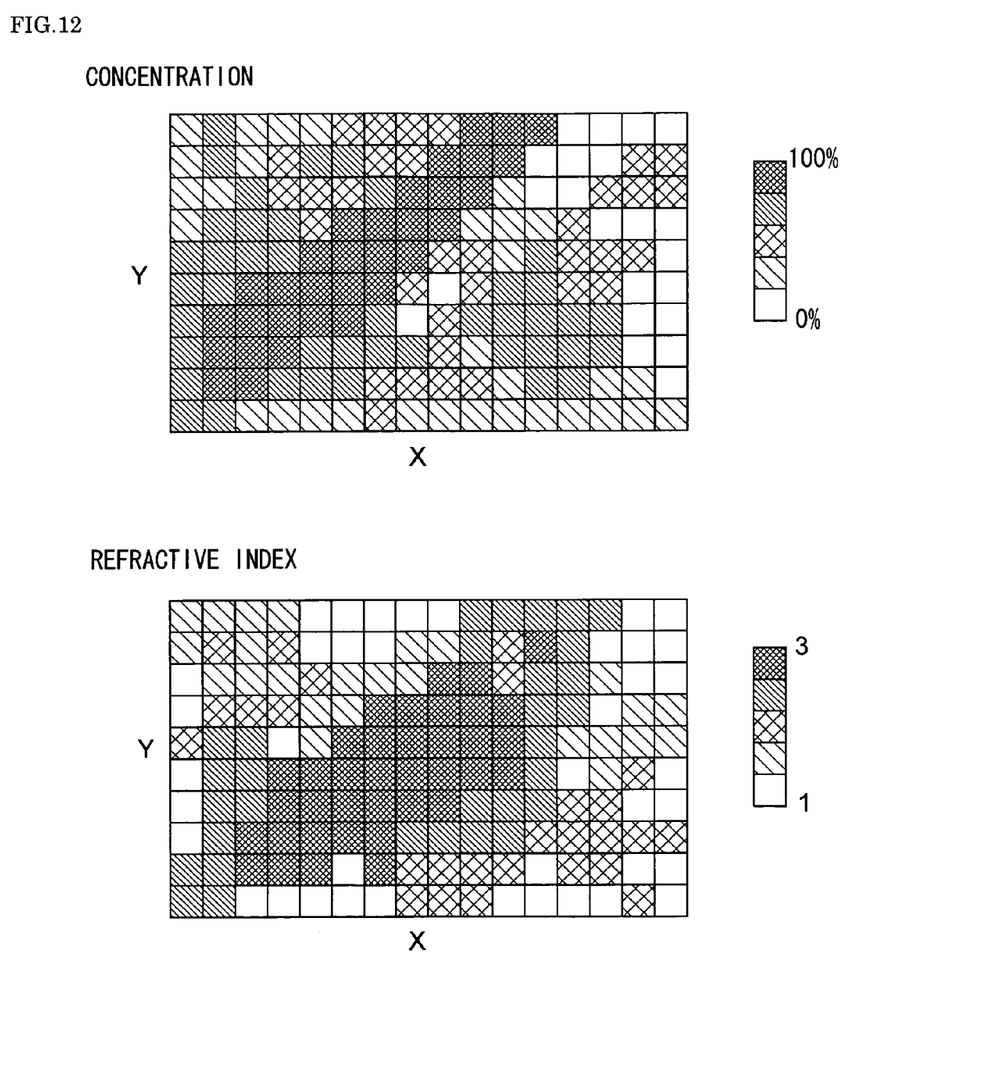
FIG. 12 is an example showing computed-value maps (two dimensional).

In a map display step S16, a map of the calculated values obtained in the calculating step S112 is displayed. FIG. 12 shows two-dimensional examples of maps. The two-dimensional maps in FIG. 12, whose horizontal and vertical axes represent the X-coordinate and Y-coordinate on the specimen surface, show different colors (different fill patterns) according to the calculated values for the points. Using the setting unit 128, the user can specify, via the input device 116, which calculated value will be used to create the map. The setting unit 128 sends a command to the corresponding map creating unit (one of units 126, 134, 138, 142, and 146) to create a map of the selected calculated value. For example, when the user wishes to display a map of the concentration and a map of the refractive index, he or she specifies in the setting unit 128 a substance for which he or she wishes to display the concentration map and other conditions by using the input device 116. Based on this information, the setting unit 128 sends setting information to the concentration-map creating unit 138 and the physical-property-map creating unit 142. Then, in the concentration-map creating unit 138 and the physical-property-map creating unit 142, concentration values, physical-properties, and so on for each point are read out from the storage device 118 to create the maps. The created maps are then displayed on the display device 114 by the display control circuit 130. Each of the maps described above may be displayed as a three-dimensional graph in which the XY plane represents the specimen surface and the Z-axis represents the calculated value.

In a grouping setting step S118, criteria for grouping each point inside a predetermined area on the specimen surface into a plurality of groups are set based on the plurality of calculated values calculated in the calculating step S112 described above. For example, the criteria are set such that samples (points on the specimen surface) whose first principal component scores are from 10 to 30 inclusive, whose film thicknesses are 100 μm or above, and whose correlation coefficients with respect to polyethylene are 0.8 or above form a first group, and so forth. Also in this embodiment, in the same way as in the first embodiment, the user can set the grouping criteria using a scatterplot such as that shown in FIG. 10 or 11 or a map such as those shown in FIG. 12.

In a grouped-map display step S120, a two-dimensional or three-dimensional map that indicates to which group each point on the specimen surface belongs is displayed based on the specified grouping criteria. A grouped-map creating unit 122 reads out from the storage device 118 the grouping criteria as well as the calculated values for the samples (spectra measured at points on the specimen surface) to which those grouping criteria are applied, determines to which group those samples belong based on the grouping criteria, and creates a grouped map such as that shown in FIG. 7. The created grouped map is then displayed on the display device 114 by the display control circuit 130.

With the present embodiment, it is possible to specify grouping criteria not just for principal component scores, but also for other calculated values, such as the degree of similarity to a desired substance, physical-properties such as refractive index or dielectric constant, the film thickness of a material, and the concentration of a substance. Therefore, it is possible to perform mapping-data analysis more intuitively and simply.

Figure 13:
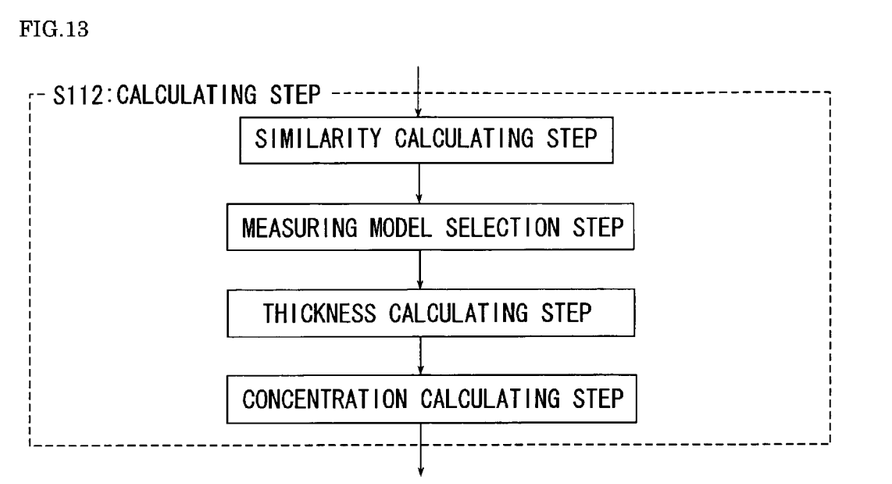
FIG. 13 is an example flow chart in a case where a plurality of calculations are combined to obtain a desired computed value in a calculating step.

In the calculating step S112 described above, it is also preferable to obtain desired calculated values by combining a plurality of calculations. FIG. 13 shows an example of this procedure. As shown in FIG. 13, in a similarity calculating step, the similarity calculating unit 132 calculates similarity from the spectrum at each point. Next, in a measuring model selection step, the substance contained at each point is identified based on the similarity obtained in the similarity calculating step. For example, it may be determined that a point contains a substance when the degree of similarity to the substance is above a predetermined threshold value. A plurality of measuring models are stored in advance in the storage device 118, and the concentration calculating unit 136 selects a suitable model based on the similarity calculated in the similarity calculating step. Next, in a thickness calculating step, the film thickness at each point is calculated. Subsequently, in a concentration calculating step, the measuring model selected above and the film thickness obtained in the thickness calculating step are used to calculate the concentration at each point.

Figure 14:
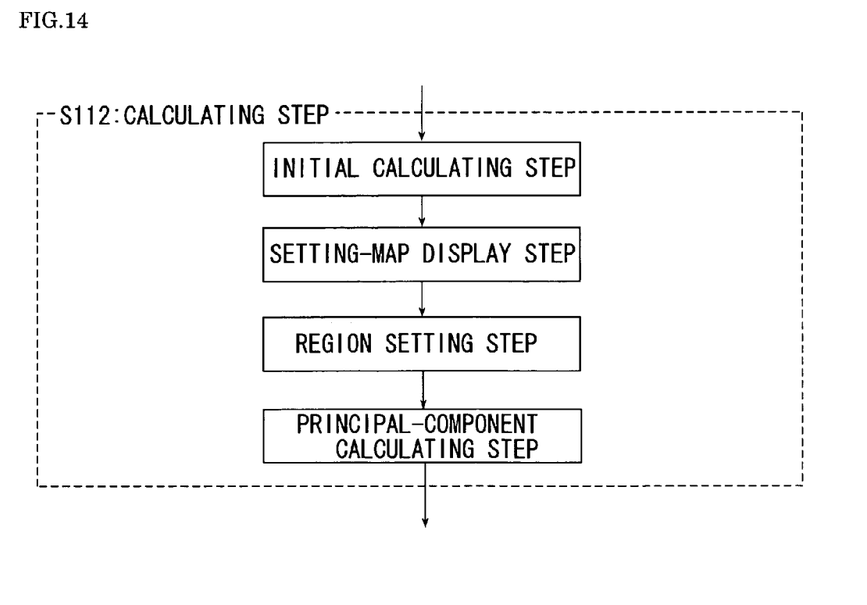
FIG. 14 is an example flow chart showing a case, in the analyzing method according to the second embodiment, in which a region on a specimen surface is selected for principal component analysis.

In the calculating step S112 described above, it is also preferable to specify a region on the specimen surface to be used for principal component analysis. As shown in FIG. 14, after obtaining the desired calculated values (calculated values other than the principal component scores) in an initial calculating step, a map of those calculated values is displayed in a setting-map display step. Then, in a region setting step, the user selects a region on the specimen surface for performing principal component analysis by referring to that map. Then, in a principal-component calculating step, the spectral data for each point in the selected region is defined as an individual sample, and principal component analysis is performed. By restricting the region to be subjected to principal component analysis in this way, it is possible to reduce the time required for calculation.

It is also preferable to combine a plurality of calculated values and to display them as a single map. For example, it is possible to associate three different calculated values with three primary colors and to display the map in color.

What is claimed is:

1. A mapping-data analyzing method for analyzing mapping data obtained by measuring, with a spectrometer apparatus, spectra at a plurality of points on a specimen surface, comprising:
    a principal-component calculating step of defining at least part of spectral data obtained at each point on the specimen surface as an individual sample and performing principal component analysis, in which values at a plurality of wave numbers of each spectral data set serve as variables, to calculate the scores of a plurality of principal components for each individual sample; and
    a grouped-map display step of dividing the points on the specimen surface into a plurality of groups based on the scores of a plurality of principal components calculated in the principal-component calculating step, and displaying on a display device a two-dimensional or three-dimensional map indicating to which group each point on the specimen surface belongs.

2. A mapping-data analyzing method according to claim 1, further comprising:
    a scatterplot display step of displaying on the display device a two-dimensional or three-dimensional scatterplot of the individual samples, in which a plurality of principal components calculated in the principal-component calculating step define axes; and a grouping setting step of setting grouping criteria in the grouped-map display step on the basis of the scatterplot displayed on the display device in the scatterplot display step.

3. A mapping-data analyzing method according to claim 1, further comprising:

a principal-component-score map display step of displaying on the display device a two-dimensional or three-dimensional map of the scores of a principal component calculated in the principal-component calculating step.

4. A mapping-data analyzing method according to claim 1, further comprising:

a similarity calculating step of calculating the similarity between the spectral data obtained at each point on the specimen surface and spectral data for one or a plurality of known substances, which is stored in a spectrum database.

5. A mapping-data analyzing method according to claim 4, wherein the similarity is a correlation coefficient or a Euclidean distance.

6. A mapping-data analyzing method according to claim 4, further comprising:

a step of displaying on the display device a two-dimensional or three-dimensional map of the similarity calculated in the similarity calculating step.

7. A mapping-data analyzing method according to claim 4, wherein the grouping performed in the grouped-map display step is carried out on the basis of the similarity.

8. A mapping-data analyzing method according to claim 1, further comprising:

a concentration calculating step of calculating the concentration of a predetermined substance present at each point on the specimen surface, from the spectral data obtained at each point on the specimen surface.

9. A mapping-data analyzing method according to claim 8, wherein the grouping performed in the grouped-map display step is carried out on the basis of the concentration calculated in the concentration calculating step.

10. A mapping-data analyzing method according to claim 8, further comprising:

a concentration-map display step of displaying a two-dimensional or three-dimensional map of the concentration calculated in the concentration calculating step.

11. A mapping-data analyzing method according to claim 1, further comprising:

a physical-property calculating step of calculating a physical-property at each point on the specimen surface, from the spectral data measured at each point on the specimen surface.

12. A mapping-data analyzing method according to claim 11, wherein the physical-property calculated in the physical-property calculating step is refractive index or dielectric constant.

13. A mapping-data analyzing method according to claim 11, wherein the grouping performed in the grouped-map display step is carried out on the basis of the physical-property calculated in the physical-property calculating step.

14. A mapping-data analyzing method according to claim 11, further comprising:

a physical-property-map display step of displaying on the display device a two-dimensional or three-dimensional map of the physical-property calculated in the physical-property calculating step.

15. A mapping-data analyzing method according to claim 1, further comprising:

a thickness calculating step of calculating a thickness at each point on the specimen surface, from the spectral data measured at each point on the specimen surface.

16. A mapping-data analyzing method according to claim 15, wherein the grouping performed in the grouped-map display step is carried out on the basis of the thickness at each point of the specimen, which is calculated in the thickness calculating step.

17. A mapping-data analyzing method according to claim 15, further comprising:

a thickness-map display step of displaying on the display device a two-dimensional or three-dimensional map of the thickness at each point on the specimen surface, which is calculated in the thickness calculating step.

18. A mapping-data analyzing program wherein each step in the mapping-data analyzing method according to claim 1 is executed on a computer.

19. A mapping-data analyzing apparatus for analyzing mapping data obtained by measuring, with a spectrometer apparatus, spectra at a plurality of points on a specimen surface, comprising:

a storage device for storing spectral data for each point on the specimen surface;

a principal-component calculating unit for defining at least part of the spectral data stored in the storage device as individual samples and performing principal component analysis, in which values at a plurality of wave numbers in each spectral data set serve as variables, to calculate the scores of a plurality of principal components for each individual sample;

a grouped-map creating unit for dividing the points on the specimen surface into a plurality of groups on the basis of the scores of a plurality of principal components calculated in the principal-component calculating unit and, on the basis of this grouping, creating a two-dimensional or three-dimensional grouped map that indicates to which group each point on the specimen surface belongs; and a display device for displaying the grouped map.

* * * * *